(12) United States Patent
Rakesh et al.

(10) Patent No.: US 12,235,739 B2
(45) Date of Patent: Feb. 25, 2025

(54) INTRA-BACKUP ANOMALOUS OBJECT MANAGEMENT AND POST-BACKUP EXCLUSION RULE CREATION

(71) Applicant: Dell Products L.P., Round Rock, TX (US)

(72) Inventors: Aaditya Rakesh, Bathinda (IN); Upanshu Singhal, Bangalore (IN); Nancy Jain, Bengaluru (IN)

(73) Assignee: DELL PRODUCTS L.P., Round Rock, TX (US)

( * ) Notice: Subject to any disclaimer, the term of this patent is extended or adjusted under 35 U.S.C. 154(b) by 78 days.

(21) Appl. No.: 18/298,429

(22) Filed: Apr. 11, 2023

(65) Prior Publication Data
US 2024/0345931 A1    Oct. 17, 2024

(51) Int. Cl.
*G06F 12/00*   (2006.01)
*G06F 11/14*   (2006.01)

(52) U.S. Cl.
CPC ...... *G06F 11/1469* (2013.01); *G06F 11/1448* (2013.01)

(58) Field of Classification Search
CPC ...... G06F 3/0647; G06F 3/065; G06F 3/0652; G06F 3/0683; G06F 11/1446; G06F 11/1471; G06F 12/16
See application file for complete search history.

(56) References Cited

U.S. PATENT DOCUMENTS

| | | | | |
|---|---|---|---|---|
| 11,782,803 B2* | 10/2023 | Upadhyay | ........... | G06F 11/1464 711/162 |
| 11,899,538 B2* | 2/2024 | Yadav | ................. | G06F 11/1448 |

* cited by examiner

*Primary Examiner* — Shawn X Gu
(74) *Attorney, Agent, or Firm* — Aly Z. Dossa; Chamberlain, Hrdlicka, White, Williams & Aughtry

(57) ABSTRACT

A method, non-transitory computer readable medium, and a system for intra-backup anomalous object management and post-backup exclusion rule creation. Enterprise information technology environments often include any number of assets maintaining vast quantities of data and state. Any asset, in turn, may be riddled with various anomalous objects that tend to cause backup failure. Embodiments described herein address backup failure due to the presence of anomalous objects by, while any number of assets undergo backup, objects across said asset(s) may be assessed against object exclusion lists, populated during a pre-backup stage, to identify any anomalous objects of said objects. Once identified, the anomalous object(s) (or metadata descriptive thereof) may be recorded as backup metadata, which may be used in the post-backup creation of one or many exclusion rule(s). The exclusion rule(s) impact, and thus adjust, the backup policy/policies associated with the asset(s) on which the anomalous object(s) had been identified.

20 Claims, 10 Drawing Sheets

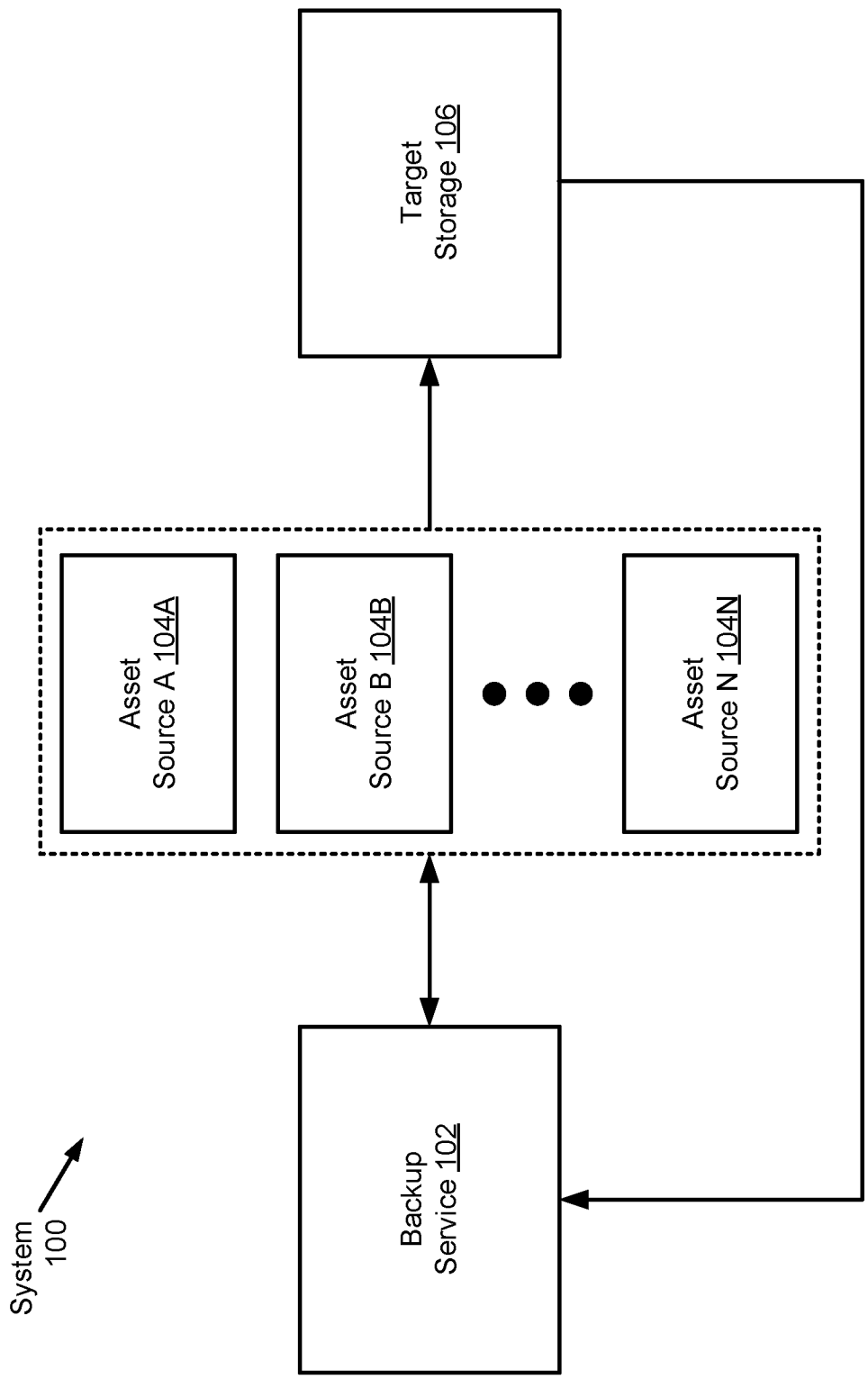

INTRA-BACKUP ANOMALOUS OBJECT MANAGEMENT AND POST-BACKUP EXCLUSION RULE CREATION

BACKGROUND

Any enterprise information technology (IT) environment often includes any number of assets (e.g., local storage, network attached storage (NAS) shares, virtual machines, and database applications, etc.) maintaining vast quantities of data and state pertinent to enterprise operations and/or services. Any asset, in turn, may be riddled with various anomalous objects—the presence of which tends to cause backup failure, thereby reducing backup performance and rendering enterprise data and state unprotected.

SUMMARY

In general, in one aspect, embodiments described herein relate to a method for anomalous object management during backup operations. The method includes: identifying a target asset; for at least one target asset slice of multiple target asset slices partitioning the target asset: identifying an anomalous target asset slice object; excluding the anomalous target asset slice object from source backup data; creating, within source backup metadata, a source backup metadata record for the anomalous target asset slice object; and writing the source backup data and the source backup metadata to target storage.

In general, in one aspect, embodiments described herein relate to a non-transitory computer readable medium (CRM). The non-transitory CRM includes computer readable program code, which when executed by a computer processor, enables the computer processor to perform a method for anomalous object management during backup operations. The method includes: identifying a target asset; for at least one target asset slice of multiple target asset slices partitioning the target asset: identifying an anomalous target asset slice object; excluding the anomalous target asset slice object from source backup data; creating, within source backup metadata, a source backup metadata record for the anomalous target asset slice object; and writing the source backup data and the source backup metadata to target storage.

In general, in one aspect, embodiments described herein relate to a system. The system includes: target storage; a target asset; and an asset source through which the target asset is accessible, operatively connected to the target storage, and includes: a computer processor configured to perform a method for anomalous object management during backup operations. The method includes: identifying a target asset; for at least one target asset slice of multiple target asset slices partitioning the target asset: identifying an anomalous target asset slice object; excluding the anomalous target asset slice object from source backup data; creating, within source backup metadata, a source backup metadata record for the anomalous target asset slice object; and writing the source backup data and the source backup metadata to the target storage.

Other aspects described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

FIG. 1A shows a system in accordance with one or more embodiments described herein.

DETAILED DESCRIPTION

Figure 1B:
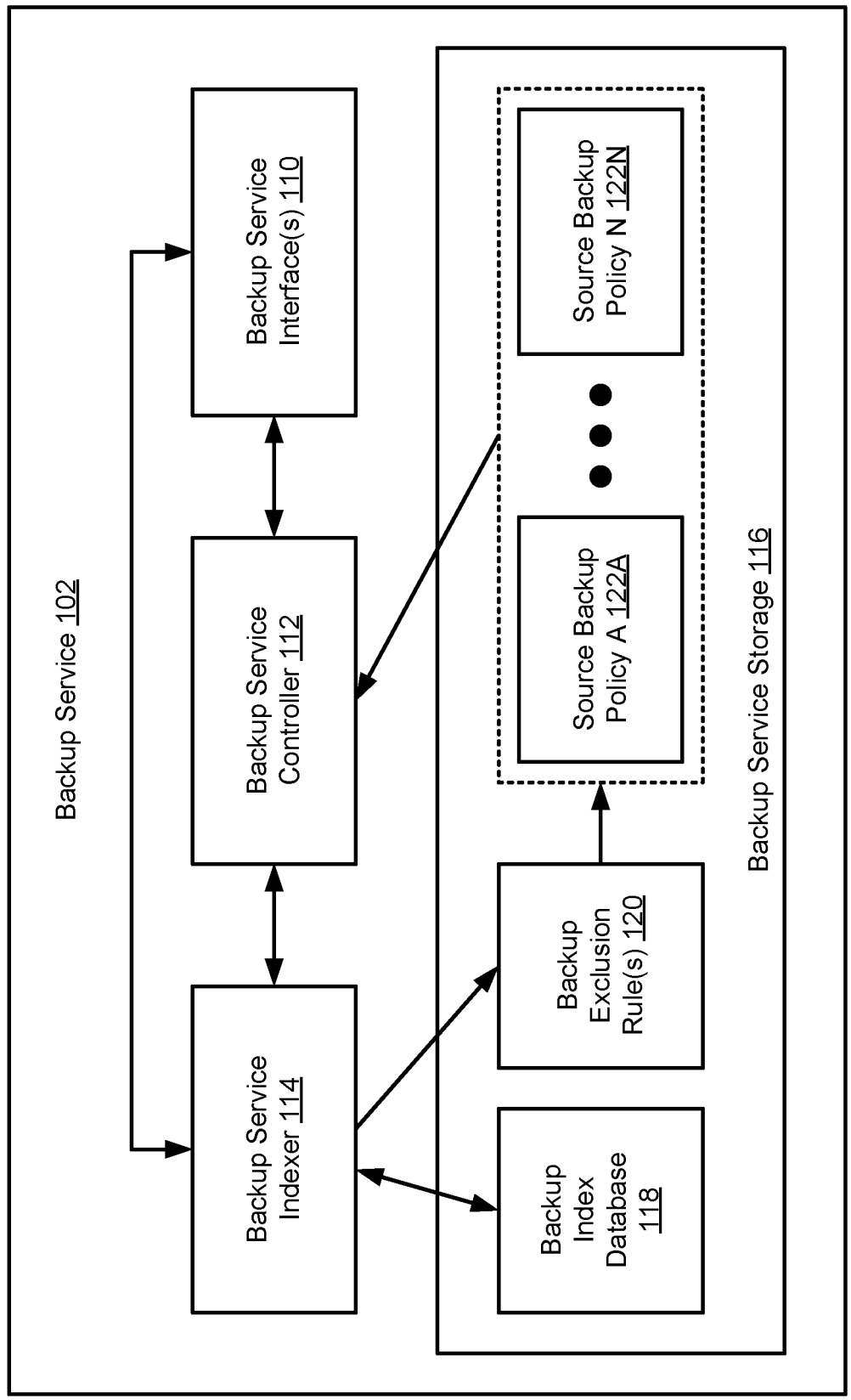
FIG. 1B shows a backup service in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to intra-backup anomalous object management and post-backup exclusion rule creation. Particularly, any enterprise information technology (IT) environment often includes any number of assets (e.g., local storage, network attached storage (NAS) shares, virtual machines, and database applications, etc.) maintaining vast quantities of data and state pertinent to enterprise operations and/or services. Any asset, in turn, may be riddled with various anomalous objects taking form, for example, as irregular files (e.g., pipe, socket, or symbolic link files), corrupt or otherwise inaccessible files, cloud-tier files, orphaned files, compressed files, and snapshot directories. When attempting to backup any said asset(s), the presence of these anomalous objects tend to promote backup failure, thereby reducing backup performance and rendering enterprise data and state unprotected.

Further, existing technologies are ill-equipped to mitigate the issue—with many lacking the capabilities to detect, and much less filter out, said anomalous objects to guarantee backup success. Some existing technologies, when faced with compressed or cloud-tier files, hastily begin backing up these files, which first require rehydration (e.g., decompression, migration, or other forms of data/state reconstitution to regain accessibility of the data/state prior to backup) and, therefore, unnecessarily extend backup time. Other existing technologies, meanwhile, produce log files detailing backup failures, however, force administrators or users to manually comb though said log files in order to identify the reason(s) and/or any anomalous objects behind the backup failures.

Embodiments described herein, accordingly, address the above-mentioned issues through intra-backup anomalous object management and post-backup exclusion rule creation. More specifically, while any number of assets is/are undergoing backup, objects (e.g., directories and/or files) across said asset(s) may be assessed against object exclusion lists, populated during a pre-backup stage, to identify any anomalous objects of said objects. Once identified, the anomalous object(s) (or metadata descriptive thereof) may be recorded as backup metadata, which may be used in the post-backup creation of one or many exclusion rule(s). The exclusion rule(s), in turn, impact, and thus adjust, the backup policy/policies associated with the asset(s) on which the anomalous object(s) had been identified.

FIG. 1A shows a system in accordance with one or more embodiments described herein. The system (100) may include a backup service (102), any number of asset sources (104A-104N), and target storage (106). Each of these system (100) components is described below.

In one or many embodiment(s) described herein, the backup service (102) may represent any enterprise IT infrastructure at least configured to initiate intra-backup anomalous object management and conduct post-backup exclusion rule(s) creation. To that end, the backup service (102) may include functionality to generate and submit, to any asset source(s) (104A-104N), a target asset backup object including unstructured information relevant to the successful execution of a backup operation centered about any target asset(s) (e.g., asset(s) (see e.g., FIG. 1C) targeted for backup), where the target asset(s) may be hosted on/by, or otherwise made accessible through, the asset source(s) (104A-104N). The backup service (102) may also include functionality to perform the method illustrated and described with respect to FIGS. 3A and 3B, below. One of ordinary skill, however, will appreciate that the backup service (102) may perform other functionalities without departing from the scope of the embodiments described herein.

In one or many embodiment(s) described herein, the backup service (102) may be implemented through on-premises infrastructure, cloud computing infrastructure, or any hybrid infrastructure thereof. The backup service (102), accordingly, may be implemented using one or more network servers (not shown), where each network server may represent a physical or a virtual network server. Additionally, or alternatively, the backup service (102) be implemented using one or more computing systems similar to the exemplary computing system shown in FIG. 4. Moreover, the backup service (102) is illustrated and described in further detail with respect to FIG. 1B, below.

In one or many embodiment(s) described herein, any asset source (104A-104N) may represent any physical appliance or computing system configured to receive, generate, process, store, and/or transmit data (and metadata descriptive thereof), as well as to provide an environment in which any number of computer programs and/or assets (see e.g., FIG. 1C) may execute or be maintained thereon. The computer program(s) may, for example, implement large-scale and complex data processing; or implement one or more services offered locally or over a network, whereas the asset(s) may retain the vast quantities of data and state pertinent to enterprise operations and/or services.

Further, in one or many embodiment(s) described herein, in providing an execution environment for any computer program(s) installed thereon, any asset source (104A-104N) may include and allocate various resources (e.g., computer processors, memory, storage, virtualization, network bandwidth, etc.), as needed, to the computer program(s) and/or the tasks (or processes) instantiated thereby. One of ordinary skill, however, will appreciate that any asset source (104A-104N) may perform other functionalities without departing from the scope of the embodiments described herein. Examples of any asset source (104A-104N) may include, but may not be limited to, a desktop computer, a laptop computer, a network server, a network mainframe, a smartphone, a tablet computer, or any other computing system similar to the exemplary computing system shown in FIG. 4. Moreover, any asset source (104A-104N) is illustrated and described in further detail with respect to FIG. 1C, below.

In one or many embodiment(s) described herein, the target storage (106) may represent any information backup, archiving, and/or disaster recovery storage system. The target storage (106) may be implemented using one or many storage server(s) (not shown). Each storage server may refer to a physical network server, or a virtual network server, that resides, or may be implemented, on a cloud computing environment. Additionally, or alternatively, the target storage (106) may be implemented using one or many computing system(s) similar to the exemplary computing system illustrated and described with respect to FIG. 4, below, where said computing system(s) may also reside, or may be implemented, on a cloud infrastructure.

In one or many embodiment(s) described herein, the storage server(s) of the target storage (106) may be supported by a collection of one or more physical storage devices (not shown) on which various forms of digital information—e.g., any number of source backup data and/or metadata (see e.g., FIG. 1D)—may be maintained. Each physical storage device may encompass non-transitory computer readable storage media on which said digital information may be stored in whole or in part, and temporarily or permanently. Further, the physical storage device(s) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, the target storage (106) is illustrated and described in further detail with respect to FIG. 1D, below.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

FIG. 1B shows a backup service in accordance with one or more embodiments described herein. The backup service (102) may include any number of backup service interfaces (110), a backup service controller (112), a backup service indexer (114), and backup service storage (116). Each of these backup service (102) components is described below.

In one or many embodiment(s) described herein, any backup service interface (110) may refer to networking hardware (e.g., a network card or adapter), a computer program implementing a logical interface (e.g., an application programming interface (API)) and executing on the underlying hardware of the backup service (102), an inter-activity protocol, or any combination thereof, configured to enable or facilitate communications (or information exchange) between the backup service (102) and other entities (e.g., any number of asset sources (see e.g., FIGS. 1A and 1C) and the target storage (see e.g., FIGS. 1A and 1D)).

To that end, in one or many embodiment(s) described herein, any backup service interface (110) may include functionality to: obtain any number of target asset backup objects, each specifying any number of target assets and unstructured information relevant to successfully executing a backup of said target asset(s), from the backup service controller (112); transmit the obtained target asset backup object(s) to any number of asset sources on (or through) which said target asset(s), specified in the target asset backup object(s), is/are maintained (or accessible); receive, in response to the transmitted target asset backup object(s), any number of target asset backup completion reports, each providing details concerning the successful backup of the target asset(s), from the asset source(s); provide the received target asset backup completion report(s) to the backup service controller (112) for processing; obtain anomalous object analytics, detailing analyses on any number of anomalous directories and/or files discovered across the target asset(s), from the backup service controller (112); and transmit the obtained anomalous object analytics to any number of administrators and/or users of the system (see e.g., 1A) for evaluation. One of ordinary skill, however, will appreciate that any backup service interface (110) may perform other functionalities without departing from the scope of the embodiments described herein.

In one or many embodiment(s) described herein, the backup service controller (112) may refer to instruction-processing hardware (e.g., any number of integrated circuits for processing computer readable instructions), a computer program executing on the underlying hardware of the backup service (102), or any combination thereof, configured to oversee and/or manage backup service (102) operations. To that end, the backup service controller (112) may include functionality to: generate and provide, to the backup service interface(s) (110) for transmission towards any number of asset sources, any number of target asset backup objects each specifying any number of target assets accessible through said asset source(s) and unstructured information relevant to successfully executing a backup of said target asset(s); obtain any number of target asset backup completion reports, regarding the completed backup of said target asset(s), from the backup service interface(s) (110); process the obtained target asset backup completion report(s), respective to the target asset(s), at least in part per the method illustrated and described with respect to FIGS. 3A and 3B, below, to obtain anomalous object analytics; and provide said anomalous object analytics to the backup service interface(s) (110) for transmission/presentation towards any number of administrators and/or users. One of ordinary skill, however, will appreciate that the backup service controller (112) may perform other functionalities without departing from the scope of the embodiments described herein.

In one or many embodiment(s) described herein, the backup service indexer (114) may refer to instruction-processing hardware (e.g., any number of integrated circuits for processing computer readable instructions), a computer program executing on the underlying hardware of the backup service (102), or any combination thereof, configured to index copies of enterprise information written to the target storage (see e.g., FIGS. 1A and 1D) during backup(s) of any number of target assets. To that end, the backup service indexer (114) may include functionality to: read, or otherwise access, source backup metadata (including any number of source backup metadata records) from target storage; for each of the read source backup metadata record(s), identify a directory or a file (e.g., a target asset slice object), of an asset target that had undergone backup, associated with the read source backup metadata record; create a backup index database entry for each of the identified directory/directories and/or file(s); identify any number of target asset slice objects (e.g., anomalous target asset slice objects) that had been excluded from the backup of any number of target assets; create any number of backup exclusion rules based on the identified anomalous target asset slice object(s); and adjust any number of source backup policies, respective to any number of asset sources through which the target asset(s) is/are accessible, using the created backup exclusion rule(s). One of ordinary skill, however, will appreciate that the backup service indexer (114) may perform other functionalities without departing from the scope of the embodiments described herein.

In one or many embodiment(s) described herein, the backup service storage (116) may refer to a collection of one or more physical storage devices (not shown) on which various forms of digital information—e.g., a backup index database (118) (described below), any number of backup exclusion rules (120) (described below), and any number of source backup policies (122A-122N) (described below)—may be maintained. Each physical storage device may encompass non-transitory computer readable storage media on which said digital information may be stored in whole or in part, and temporarily or permanently. Further, the backup service storage (116) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) described herein, the backup index database (118) may refer to a dedicated data repository configured to maintain any number of backup index database entries (not shown). Each backup index database entry, in turn, may store object metadata descriptive of a given target asset slice object—i.e., (a) a given regular file included in a backup of a target asset to target storage, or (b) a given anomalous directory or file excluded from a backup of a target asset to target storage. Further, said object metadata, respective to any target asset slice object, may include: an object path specifying a file system location of the target asset slice object within a target asset; a number or cardinality of child objects (e.g., sub-directories and/or files) (if any) contained within/by the target asset slice object; and/or (if applicable) at least one reason justifying an exclusion of the target asset slice object from any backup of the target asset. Furthermore, the object metadata, specified in any backup index database entry, is not limited to the aforementioned specific examples.

In one or many embodiment(s) described herein, any backup exclusion rule (120) may refer to a rule (or filter) configured to exclude any number of specified directories and/or files from any current and/or future backup operation(s) centered about any given asset source. The specified directory/directories and/or file(s), accordingly, may reflect anomalous object(s) managed by, and thus maintained on, the given asset source during their processing of any target asset backup object(s) (see e.g., FIGS. 2A-2C) directed thereto from/by the backup service (102). Further, any backup exclusion rule (120) may be dynamically created by the backup service controller (112) and/or the backup service indexer (114) (see e.g., FIGS. 3A and 3B) based, at least in part, on any received target asset backup completion reports from, and for any target asset(s) specified in any target asset backup object(s) directed to, the given asset source.

In one or many embodiment(s) described herein, any source backup policy (122A-122N) may refer to a set of rules and procedures outlining a strategy for protecting (e.g., via any number of backup operations) data, metadata, and/or state maintained on any given asset source. The set of rules and procedures may, for example, dictate: which data, metadata, and/or state maintained on the given asset source should be protected; where (e.g., one or more target storages) should backup copies of any protected data, metadata, and/or state be stored; how often should a backup operation centered about the given asset source transpire; and how long should any backup copies of any protected data, metadata, and/or state be retained. The set of rules and procedures may further include, or may be adjusted based on, any created backup exclusion rule(s) (120) relevant to the given asset source.

While FIG. 1B shows a configuration of components and/or subcomponents, other backup service (102) configurations may be used without departing from the scope of the embodiments described herein.

Figure 1C:
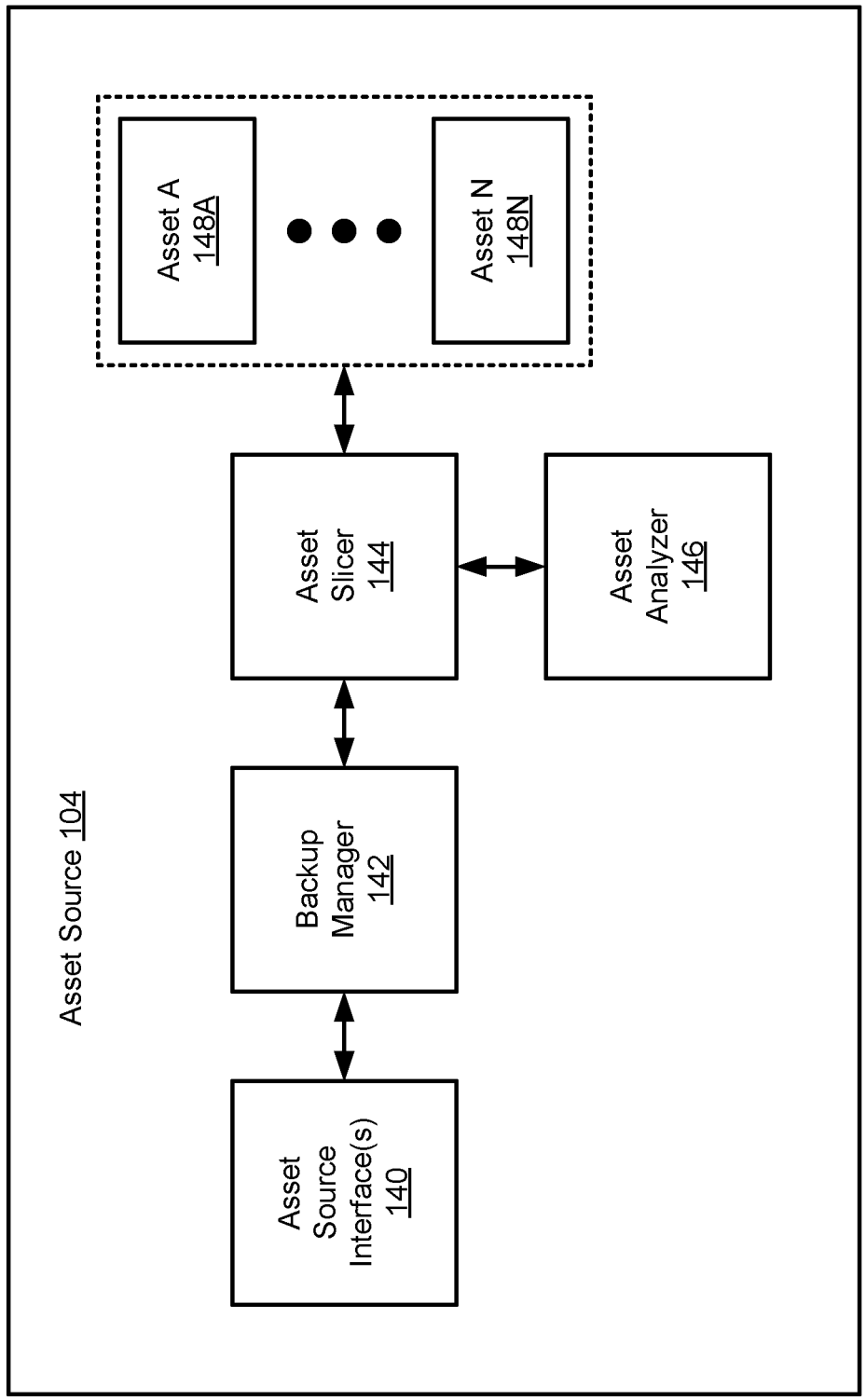
FIG. 1C shows an asset source in accordance with one or more embodiments described herein.

FIG. 1C shows an asset source in accordance with one or more embodiments described herein. The asset source (104) may include any number of asset source interfaces (140), a backup manager (142), an asset slicer (144), an asset analyzer (146), and any number of assets (148A-148N). Each of these asset source (104) components is described below.

In one or many embodiment(s) described herein, any asset source interface (140) may refer to networking hardware (e.g., a network card or adapter), a computer program implementing a logical interface (e.g., an application programming interface (API)) and executing on the underlying hardware of the asset source (104), an interactivity protocol, or any combination thereof, configured to enable or facilitate communications (or information exchange) between the asset source (104) and other entities (e.g., the backup service (see e.g., FIGS. 1A and 1B) and the target storage (see e.g., FIGS. 1A and 1D)).

To that end, in one or many embodiment(s) described herein, any asset source interface (140) may include functionality to: receive any number of target asset backup objects, each specifying any number of target assets and unstructured information relevant to successfully executing a backup of said target asset(s), from the backup service; provide the received target asset backup object(s) to the backup manager (142) for processing; obtain, for any number of target assets (e.g., asset(s) (148A-148N) targeted for backup), source backup data and source backup metadata from the backup manager (142); write, or otherwise transmit, the obtained source backup data and source backup metadata, for the target asset(s), to target storage; obtain any number of target asset backup completion reports, each specifying backup logs and any number of directories and/or files excluded from the backup of the target asset(s), from the backup manager (142); and present, or otherwise transmit, the obtained target asset backup completion report(s) to the backup service. One of ordinary skill, however, will appreciate that any asset source interface (140) may perform other functionalities without departing from the scope of the embodiments described herein.

In one or many embodiment(s) described herein, the backup manager (142) may refer to instruction-processing hardware (e.g., any number of integrated circuits for processing computer readable instructions), a computer program executing on the underlying hardware of the asset source (104), or any combination thereof, configured to oversee and/or manage backup operations on the asset source (104). To that end, the backup manager (142) may include functionality to: obtain any number of target asset backup objects, each specifying any number of target assets and unstructured information relevant to successfully executing a backup of said target asset(s), from any asset source interface (140); for each target asset slice (e.g., a partition of a given target asset) (via one of multiple concurrent or parallel threads) of any given target asset: (i) identify any number of target asset slice objects (e.g., directories and/or files); (ii) determine (e.g., via assessment against slice directory and/or file exclusion object(s) (if any) found within the obtained target asset backup object(s)) whether the target asset slice object(s) is/are intended to be excluded from a backup of the given target asset; (iii-a) if the target asset slice object(s) (e.g., anomalous directory/directories and/or file(s)) is/are to be excluded, exclude said target asset slice object(s) from source backup data respective to the given target asset; (iii-b) if the target asset slice object(s) (e.g., regular file(s)) is/are not to be excluded, include said target asset slice object(s) in the source backup data; (iv) increment backup excluded directory and/or file count(s) based on the excluded target asset slice object(s) (if any); (v) create source backup metadata record(s), to form source backup metadata respective to the given target asset, for the excluded and included target asset slice object(s); (vi) provide the source backup data and the source backup metadata, respective to the given target asset, to any asset source interface (140) for transmission (or writing) to target storage; (vii) generate a target asset backup completion report specifying backup logs and any number of directories and/or files excluded from the backup of given target asset; and (viii) provide the generated target asset backup completion report to any asset source interface (140) for transmission towards the backup service. One of ordinary skill, however, will appreciate that the backup manager (142) may perform other functionalities without departing from the scope of the embodiments described herein.

In one or many embodiment(s) described herein, the asset slicer (144) may refer to instruction-processing hardware (e.g., any number of integrated circuits for processing computer readable instructions), a computer program executing on the underlying hardware of the asset source (104), or any combination thereof, configured to partition or slice each of any number of target assets (e.g., any specified asset(s) (148A-148N)) maintained on the asset source (104). To that end, the asset slicer (144) may include functionality to: based on instructions obtained, or an invocation, from the backup manager (142)—create multiple target asset slices from each of the target asset(s); and relay instructions to, or an invocation of, the asset analyzer (146) from/by the backup manager (142), where said instructions or invocation may lead the asset analyzer (146) to assess any number target asset slice objects (e.g., directories and/or files), for each target asset slice of the target asset(s), to detect any number of anomalous target asset slice objects (e.g., anomalous directories and/or files). One of ordinary skill, however, will appreciate that the asset slicer (144) may perform other functionalities without departing from the scope of the embodiments described herein.

In one or many embodiment(s) described herein, the asset analyzer (146) may refer to instruction-processing hardware (e.g., any number of integrated circuits for processing computer readable instructions), a computer program executing on the underlying hardware of the asset source (104), or any combination thereof, configured to assess whether the directory/directories and/or files of any number of target assets, maintained on the asset source (104), is/are anomalous. To that end, the asset analyzer (146) may include functionality to: based on instructions obtained, or an invocation, from the backup manager (142) yet via the asset slicer (144)—assess any number target asset slice objects (e.g., directories and/or files), for each target asset slice of the target asset(s), to detect any number of anomalous target asset slice objects (e.g., anomalous directories and/or files). One of ordinary skill, however, will appreciate that the asset analyzer (146) may perform other functionalities without departing from the scope of the embodiments described herein.

In one or many embodiment(s) described herein, any asset (148A-148N) may refer to any physical or logical construct configured to access and/or maintain enterprise information (e.g., data, metadata, and/or state). Said enterprise information may, for example, be pertinent to enterprise operations and/or services. Further, said enterprise information, on any asset (148A-148N), may be organized and accessible through one or more file system implementations (e.g., disk file system(s), distributed file system(s), etc.). Examples of any asset (148A-148N) may include local storage, network attached storage (NAS) shares, virtual machines, and database applications. Any asset (148A-148N), moreover, is not limited to the aforementioned specific examples.

While FIG. 1C shows a configuration of components and/or subcomponents, other asset source (104) configurations may be used without departing from the scope of the embodiments described herein.

Figure 1D:
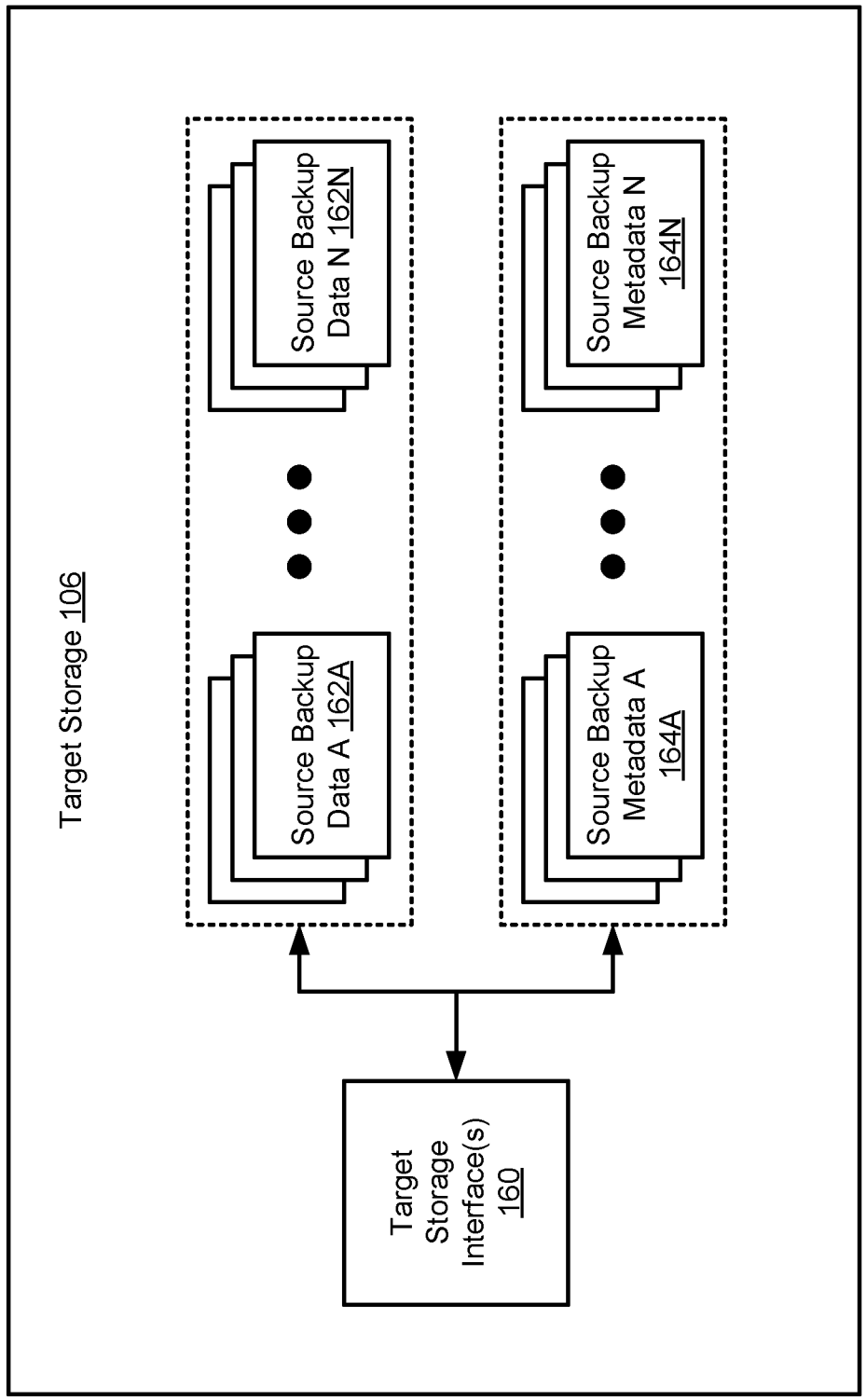
FIG. 1D shows target storage in accordance with one or more embodiments described herein.

FIG. 1D shows target storage in accordance with one or more embodiments described herein. The target storage (106) may include any number of target storage interfaces (160), any number of source backup data (162A-162N), and any number of source backup metadata (164A-164N). Each of these target storage (106) components is described below.

In one or many embodiment(s) described herein, any target storage interface (160) may refer to networking hardware (e.g., a network card or adapter), a computer program implementing a logical interface (e.g., an application programming interface (API)) and executing on the underlying hardware of the target storage (106), an interactivity protocol, or any combination thereof, configured to enable or facilitate communications (or information exchange) between the target storage (106) and other entities (e.g., the backup service (see e.g., FIGS. 1A and 1B) and any number of asset sources (see e.g., FIGS. 1A and 1C)).

To that end, in one or many embodiment(s) described herein, any target storage interface (160) may include functionality to: receive, from any number of asset sources, source backup data (162A-162N) and source backup metadata (164A-164N) (both described below) for any number of target assets (e.g., asset(s) (see e.g., FIG. 1C) targeted for backup) accessible through the asset source(s); store the received source backup data and source backup metadata; receive, from the backup service (see e.g., FIGS. 1A and 1B), read or access requests specifying any source backup metadata (164A-164N); and transmit said specified source backup metadata (164A-164N) to the backup service in response to the received read/access request(s). One of ordinary skill, however, will appreciate that any target storage interface (160) may perform other functionalities without departing from the scope of the embodiments described herein.

In one or many embodiment(s) described herein, any (individual collection of) source backup data (162A-162N) may refer to a backup copy of any number of regular (i.e., non-anomalous) directory/directories and/or file(s) belonging to a given target asset (e.g., an asset (see e.g., FIG. 1C) targeted for backup).

In one or many embodiment(s) described herein, any (individual collection of) source backup metadata (164A-164N) may refer to information descriptive of a corresponding source backup data (162A-162N) respective to a given target asset. The source backup metadata (164A-164N) may include any number of source backup metadata records (not shown). Each source backup metadata record, in turn, may store object metadata descriptive of a given target asset slice object—i.e., (a) a given regular file included in the source backup data (162A-162N), or (b) a given anomalous directory or file excluded from source backup data (162A-162N). Further, said object metadata, respective to any target asset slice object, may include: an object path specifying a file system location of the target asset slice object within the given target asset; a number or cardinality of child objects (e.g., sub-directories and/or files) (if any) contained within/by the target asset slice object; and/or (if applicable) at least one reason justifying an exclusion of the target asset slice object from the source backup data (162A-162N). Furthermore, the object metadata, specified in any source backup metadata record, is not limited to the aforementioned specific examples.

While FIG. 1D shows a configuration of components and/or subcomponents, other target storage (106) configurations may be used without departing from the scope of the embodiments described herein.

Figure 2A:
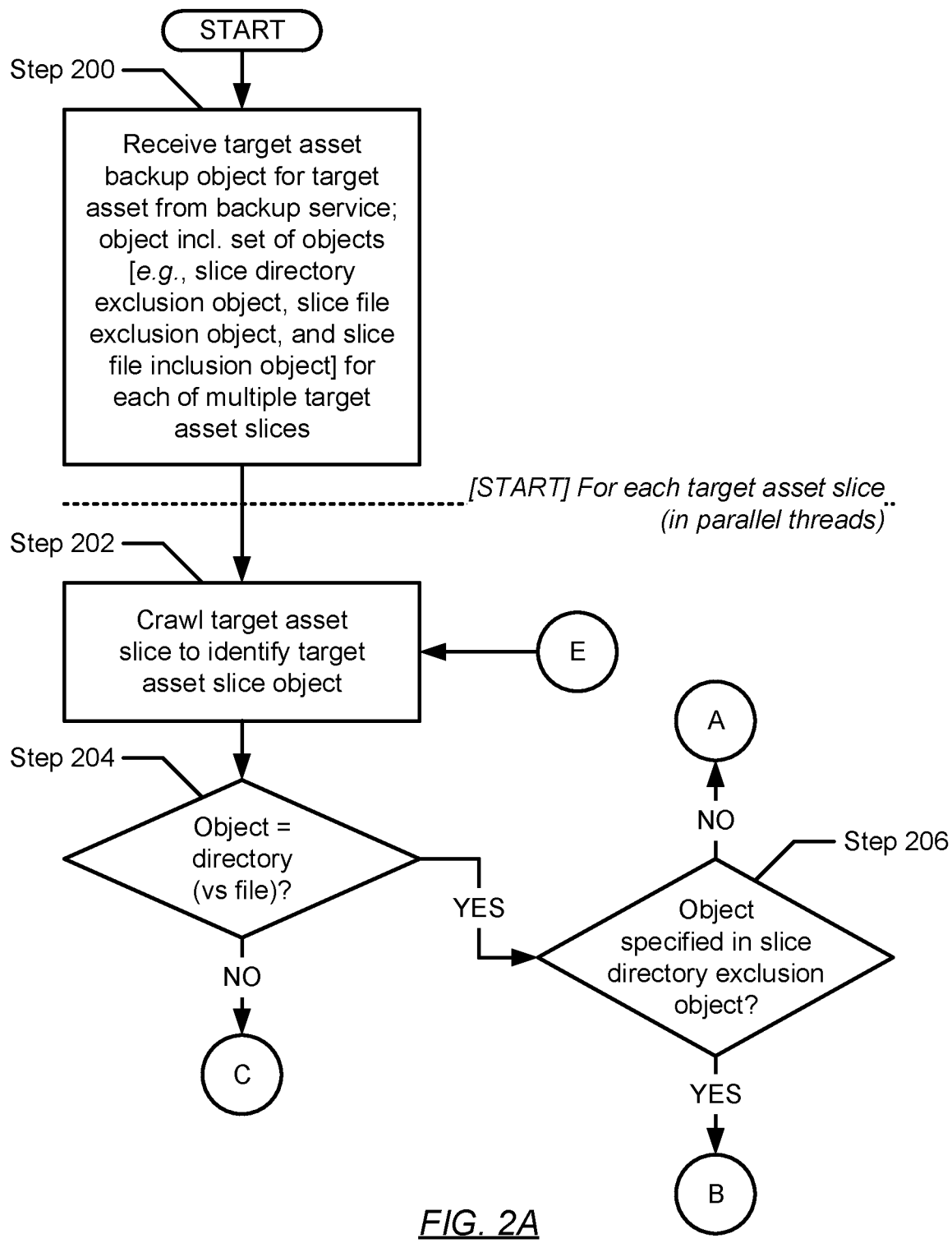
FIGS. 2A-2C show flowcharts describing a method for intra-backup anomalous object management in accordance with one or more embodiments described herein.
Figure 2B:
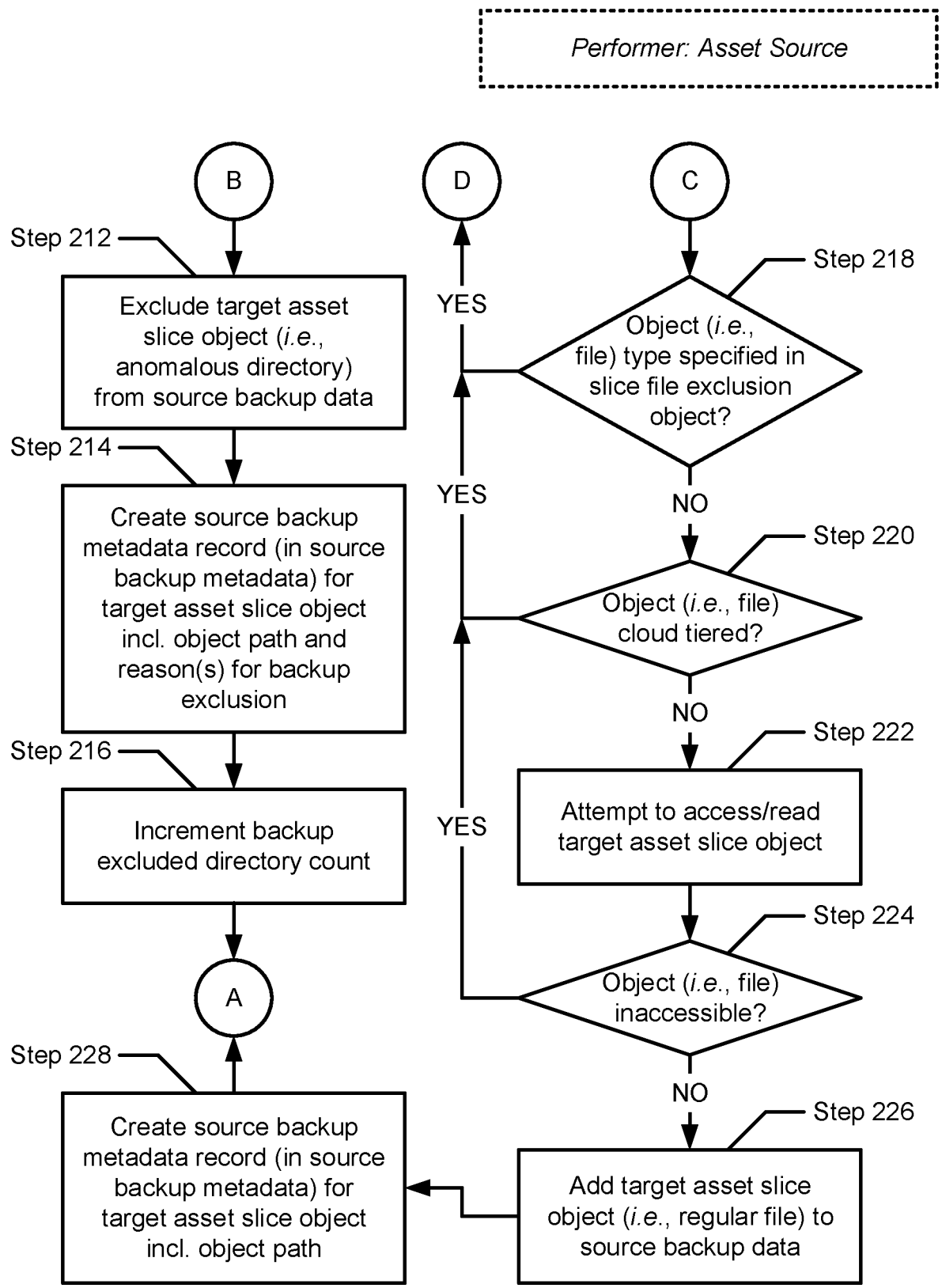
Figure 2C:
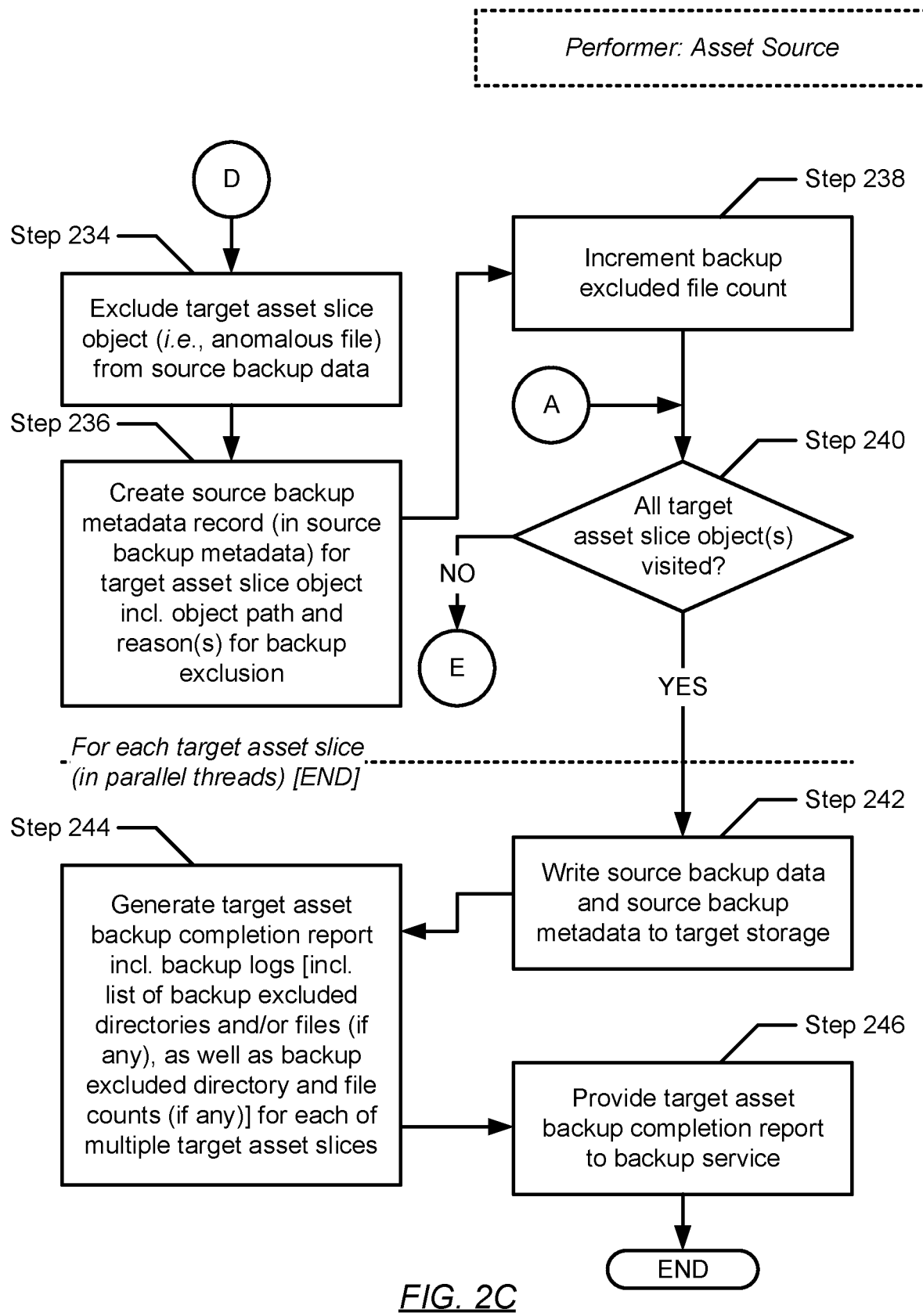

FIGS. 2A-2C show flowcharts describing a method for intra-backup anomalous object management in accordance with one or more embodiments described herein. The various steps outlined below may be performed by any asset source (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 2A, in Step 200, a target asset backup object is received from the backup service (see e.g., FIGS. 1A and 1B). In one or many embodiment(s) described herein, the target asset backup object may pertain to, and thus specify, a target asset (e.g., an asset targeted for backup) accessible by/through the asset source. Additionally, the target asset backup object may further specify unstructured information relevant to successfully executing a backup operation of the target asset. The specified unstructured information may include a set of objects for each target asset slice (described below) of multiple target asset slices created from the target asset during a pre-backup stage.

Further, in one or many embodiment(s) described herein, the above-mentioned set of objects may include: a slice directory exclusion object specifying any number of directories, within a given target asset slice, determined during the pre-backup stage to be anomalous (i.e., unpermitted for the successful backup of the target asset); a slice file exclusion object specifying any number of files, within the given target asset slice, determined during the pre-backup stage to be anomalous (i.e., unpermitted for successful backup of the target asset); and/or a slice file inclusion object specifying any number of files, within the given target asset slice, determined during the pre-backup stage to be regular (i.e., permitted for the successful backup of the target asset).

In one or many embodiment(s) described herein, any target asset slice may refer to a portion or partition of the target asset (for which the target asset backup object had been received in Step 200). Further, any target asset slice may be created such that a target asset slice size thereof does not exceed a predefined target asset slice size expressed either in bytes (e.g., 200 GB) or in a number of files (e.g., 1 million files). Moreover, as the target asset may encompass enterprise information (e.g., data, metadata, and/or state) organized and accessible through one or more file system implementations, any target asset slice created therefrom may include a portion of said enterprise information, as well as a corresponding portion of said file system implementation(s) respectively organizing and providing accessibility to said enterprise information portion.

A subset of the remaining steps (i.e., Steps 202, 204, 206, 212, 214, 216, 218, 220, 222, 224, 226, 228, 234, 236, 238, and 240) presented and described hereinafter are pertinent to, and thus are performed for, each target asset slice of the multiple target asset slices of the target asset (for which the target asset backup object had been received in Step 200). Further, any given instance of the aforementioned subset of remaining steps, respective to any given target asset slice, may be executed concurrently or in parallel with any other instance(s) of the same respective to any other target asset slice(s).

In Step 202, following receipt of the target asset backup object (in Step 200) or a determination (made in Step 240) that not all target asset slice object(s) of the target asset slice have been visited/processed, the target asset slice is crawled to identify a target asset slice object. In one or many embodiment(s) described herein, crawling of the target asset slice may, for example, entail descending through the portion of file system implementation(s) representative thereof using a depth first search (DFS) traversal algorithm. Further, the identified target asset slice object may either represent a directory or a file.

In Step 204, a determination is made as to whether the target asset slice object (identified in Step 202) is a directory versus a file. In one or many embodiment(s) described herein, if it is determined that the target asset slice object represents a directory, then the method proceeds to Step 206. On the other hand, in one or many other embodiment(s) described herein, if it is alternatively determined that the target asset slice object represents a file, then the method alternatively proceeds to Step 218 (see e.g., FIG. 2B).

In Step 206, following the determination (made in Step 204) that the target asset slice object (identified in Step 202) represents a directory, a determination is made as to whether the target asset slice object is specified in the slice directory exclusion object (if received via the target asset backup object in Step 200). In one or many embodiment(s) described herein, if it is determined that (a) the set of objects, within the target asset backup object, includes the slice directory exclusion object, and (b) the slice directory exclusion object at least specifies the target asset slice object, then the method proceeds to Step 212 (see e.g., FIG. 2B). On the other hand, in one or many other embodiment(s) described herein, if it is alternatively determined that (a) the set of objects, within the target asset backup object, excludes the slice directory exclusion object, or (b) the set of objects includes the slice directory exclusion object, however, the slice directory exclusion object does not specify the target asset slice object, then the method alternatively proceeds to Step 240 (see e.g., FIG. 2C).

Turning to FIG. 2B, in Step 212, following the determination (made in Step 206) that (a) the set of objects, within the target asset backup object (received in Step 200), includes the slice directory exclusion object, and (b) the slice directory exclusion object at least specifies the target asset slice object (identified in Step 202 and determined to be a directory in Step 204), the target asset slice object is excluded from source backup data. In one or many embodiment(s) described herein, exclusion of the target asset slice object (i.e., determined to represent an anomalous directory in Step 206), from the source backup data, may entail not creating a backup copy of the target asset slice object and, thereafter, not adding the backup copy to the source backup data.

In Step 214, a source backup metadata record, for the target asset slice object (identified in Step 202 and determined to be an anomalous directory in Step 206), is created. In one or many embodiment(s) described herein, the source backup metadata record may include, but may not be limited to: an object path specifying a file system location of the target asset slice object respective to the target asset (specified in the target asset backup object received in Step 200); a number or cardinality of child objects (e.g., sub-directories and/or files) (if any) contained within/by the target asset slice object; and at least one reason (exemplified below) justifying the exclusion of the target asset slice object from the source backup data.

Examples of the above-mentioned reason(s) for justifying the exclusion, from the source backup data of the target asset, of any directory known/determined to be anomalous may include identifying the directory as: a snapshot directory; a hidden directory; or a corrupt directory. A snapshot directory may refer to any directory that includes one or more snapshots (i.e., copies of the enterprise information (or at least a portion thereof) made accessible at least through the target asset slice. Further, due to their snapshot content, said snapshot directories thus include vast amounts of redundant data, metadata, and/or state, which, if not skipped, would be backed up and, therefore, lead to the unnecessary extension of the backup window for the backup operation—where extension of the backup window would/could increase the susceptibility of the backup operation to experience failure due to other factors (e.g., media failure, human error, software updates, cyber-attacks, and/or infrastructure failure). Meanwhile, a hidden directory may refer to any directory not displayed by default in a directory listing, which may, for example, store user preferences or utility state, whereas a corrupt directory may refer to any inaccessible or unreadable directory inflicted due to, for example, malware or storage hardware defects.

Moreover, any reason(s) and/or anomalous directory is/are not limited to the aforementioned specific examples.

In Step 216, a backup excluded directory count is incremented. In one or many embodiment(s) described herein, the backup excluded directory count may refer to a variable, implemented logically or at least partially in hardware, configured to track the number of directories, within the target asset slice, identified as anomalous and, therefore, excluded from the source backup data of the target asset.

Hereinafter, following Step 216, the method proceeds to Step 240 (see e.g., FIG. 2C).

In Step 218, following the alternate determination (made in Step 204) that the target asset slice object (identified in Step 202) represents a file, a determination is made as to whether the target asset slice object is specified in the slice file exclusion object (if received via the target asset backup object in Step 200). In one or many embodiment(s) described herein, if it is determined that (a) the set of objects, within the target asset backup object, includes the slice file exclusion object, and (b) the slice file exclusion object at least specifies the target asset slice object, then the method proceeds to Step 234 (see e.g., FIG. 2C). On the other hand, in one or many other embodiment(s) described herein, if it is alternatively determined that (a) the set of objects, within the target asset backup object, excludes the slice file exclusion object, or (b) the set of objects includes the slice file exclusion object, however, the slice file exclusion object does not specify the target asset slice object, then the method alternatively proceeds to Step 220 (described below).

In Step 220, following the alternate determination (made in Step 218) that (a) the set of objects, within the target asset backup object (received in Step 200), excludes the slice file exclusion object, or (b) the set of objects includes the slice file exclusion object, however, the slice file exclusion object does not specify the target asset slice object (identified in Step 202 and determined to be a file in Step 204), a determination is made as to whether the target asset slice object represents a cloud-tier file. Any cloud-tier file may refer to a file that resides on cloud computing infrastructure and, therefore, the determination may entail ascertaining whether the target asset slice object is maintained on cloud computing infrastructure. In one or many embodiment(s) described herein, if it is determined that the target asset slice object represents a cloud-tier file (i.e., resides on cloud computing infrastructure), then the method proceeds to Step 234 (see e.g., FIG. 2C). On the other hand, in one or many other embodiment(s) described herein, if it is alternatively determined that the target asset slice object does not represent a cloud-tier file (i.e., does not reside on cloud computing infrastructure), then the method alternatively proceeds to Step 222 (described below).

In Step 222, following the alternate determination that the target asset slice object (identified in Step 202 and determined to be a file in Step 204) does not represent a cloud-tier file (i.e., does not reside on cloud computing infrastructure), an accessing or reading of the target asset slice object is attempted.

In Step 224, based on the accessing/reading (attempted in Step 222) of the target asset slice object (identified in Step 202 and determined to be a file in Step 204), a determination is made as to whether the target asset slice object is inaccessible or unreadable. Any file may be considered inaccessible/unreadable due to a variety of factors—examples of which may include, but may not be limited to, a corruption of the data (or at least a portion thereof) representative of the file, a lack of access permission(s) by the asset source to access/read the file, a corruption of the metadata (e.g., an associated user profile) (or at least a portion thereof) corresponding to the file, and the file is encrypted. In one or many embodiment(s) described herein, if it is determined that the target asset slice object is inaccessible/unreadable, then the method proceeds to Step 234 (see e.g., FIG. 2C). On the other hand, in one or many other embodiment(s) described herein, if it is alternatively determined that the target asset slice object is accessible/readable, then the method alternatively proceeds to Step 226 (described below).

In Step 226, following the alternate determination (made in Step 224) that the target asset slice object (identified in Step 202 and determined to be a file in Step 204) is accessible/readable based on the accessing/reading thereof (attempted in Step 222), the target asset slice object is added to source backup data. In one or many embodiment(s) described herein, the target asset slice object, at this juncture, may be identified as or determined to represent a regular (i.e., non-anomalous) file. As such, the target asset slice object (or more specifically, a backup copy thereof) may be included as part of the source backup data respective to the target asset (specified in the target asset backup object received in Step 200).

In Step 228, a source backup metadata record, for the target asset slice object (identified in Step 202 and determined to be a regular file in Step 226), is created. In one or many embodiment(s) described herein, the source backup metadata record may include, but may not be limited to: an object path specifying a file system location of the target asset slice object respective to the target asset.

Hereinafter, following Step 228, the method proceeds to Step 240 (see e.g., FIG. 2C).

Turning to FIG. 2C, in Step 234, (i) following the determination (made in Step 218) that (a) the set of objects, within the target asset backup object (received in Step 200), includes the slice file exclusion object, and (b) the slice file exclusion object at least specifies the target asset slice object (identified in Step 202 and determined to be a file in Step 204), (ii) following the determination (made in Step 220) that the target asset slice object represents a cloud-tier file (i.e., resides on cloud computing infrastructure), or (iii) following the determination (made in Step 224) that the target asset slice object is inaccessible/unreadable based on the accessing/reading thereof (attempted in Step 222), the target asset slice object is excluded from source backup data. In one or many embodiment(s) described herein, exclusion of the target asset slice object (i.e., determined to represent an anomalous file in Step 218, 220, or 224), from the source backup data, may entail not creating a backup copy of the target asset slice object and, thereafter, not adding the backup copy to the source backup data.

In Step 236, a source backup metadata record, for the target asset slice object (identified in Step 202 and determined to be an anomalous file in Step 218, 220, or 224), is created. In one or many embodiment(s) described herein, the source backup metadata record may include, but may not be limited to: an object path specifying a file system location of the target asset slice object respective to the target asset (specified in the target asset backup object received in Step 200); an object type (e.g., a file type, format, and/or extension) associated with the target asset slice object; and at least one reason (exemplified below) justifying the exclusion of the target asset slice object from the source backup data.

Examples of the above-mentioned reason(s) for justifying the exclusion, from the source backup data of the target asset, of any file known/determined to be anomalous may include identifying the directory as: a corrupt file; a pipe file; a socket file; a symbolic link file; a cloud-tier file; an orphan file; a compressed file; and a deduplicated file. A corrupt file may refer to any file incapable of being opened). An irregular file may include, but is not limited to, any file(s) created for inter-process communication (IPC) purposes (e.g., pipe files, socket files, etc.) or any file(s) created to point to other file system objects (e.g., symbolic link files, etc.). Meanwhile, an inaccessible file may refer to any file unable to be accessed or read due to, for example, a lack of access permissions. A cloud-tier file may refer to any file residing on cloud computing infrastructure, which would require rehydration. Further, an orphan file may refer to any file rendered obsolete due to a computer program it was once associated with has been deleted or uninstalled. Moreover, any reason(s) and/or anomalous file is/are not limited to the aforementioned specific examples.

In Step 238, a backup excluded file count is incremented. In one or many embodiment(s) described herein, the backup excluded file count may refer to a variable, implemented logically or at least partially in hardware, configured to track the number of files, within the target asset slice, identified as anomalous and, therefore, excluded from the source backup data of the target asset.

In Step 240, (i) following the alternate determination (made in Step 206) that (a) the set of objects, within the target asset backup object (received in Step 200), excludes the slice directory exclusion object, or (b) the set of objects includes the slice directory exclusion object, however, the slice directory exclusion object does not specify the target asset slice object (identified in Step 202 and determined to be a directory in Step 204), (ii) following an incrementing of a backup excluded directory count (in Step 216), (iii) following creation of a source backup metadata record (in Step 228) for the target asset slice object (identified in Step 202 and determined to be a regular file in Step 226), or (iv) following an incrementing of a backup excluded file count (in Step 238), a determination is made as to whether all target asset slice object(s), of the target asset slice, has/have been visited/processed. In one or many embodiment(s) described herein, if it is determined that at least one target asset slice object remains to be visited via crawling of the target asset slice and thus processed, then the method proceeds to Step 202 (see e.g., FIG. 2A). On the other hand, in one or many embodiment(s) described herein, if it is alternatively determined that zero target asset slice objects remain to be visited via crawling of the target asset slice and thus processed, then the method alternatively proceeds to Step 242 (described below).

In Step 242, following the determination (made in Step 240) that zero target asset slice objects remain to be visited via crawling of each of multiple target asset slices of the target asset (for which the target asset backup object had been received in Step 200), a backup of the target asset is completed. In one or many embodiment(s) described herein, completion of said backup may entail a writing or transmission of the source backup data (added to in Step 226 for any number of the multiple target asset slices) and the source backup metadata (added to in Steps 214, 228, and/or 236 for any number of the multiple target asset slices) to target storage.

In Step 244, a target asset backup completion report is generated. In one or many embodiment(s) described herein, the target asset backup completion report may refer to a document e.g., a JavaScript Object Notation (JSON) file, a Comma Separated Values (CSV) file, a Yet Another Markup Language (YAML) file, etc.) configured to reflect metadata describing the backup of the target asset (completed in Step 242). Said reflected metadata may include, but may not be limited to: a compilation of backup logs specifying any number of events (e.g., transactions, errors/warnings (if any), etc.) that had transpired throughout the backup of the target asset; a list of any (anomalous) directory/directories and/or file(s) per target asset slice that had been excluded from the source backup data; the backup excluded directory count (incremented in Step 216) per target asset slice; and the backup excluded file count (incremented in Step 238) per target asset slice.

In Step 246, the target asset backup completion report (generated in Step 244) is provided, or otherwise transmitted, to the backup service as a response to the target asset backup object (received in Step 200).

Figure 3A:
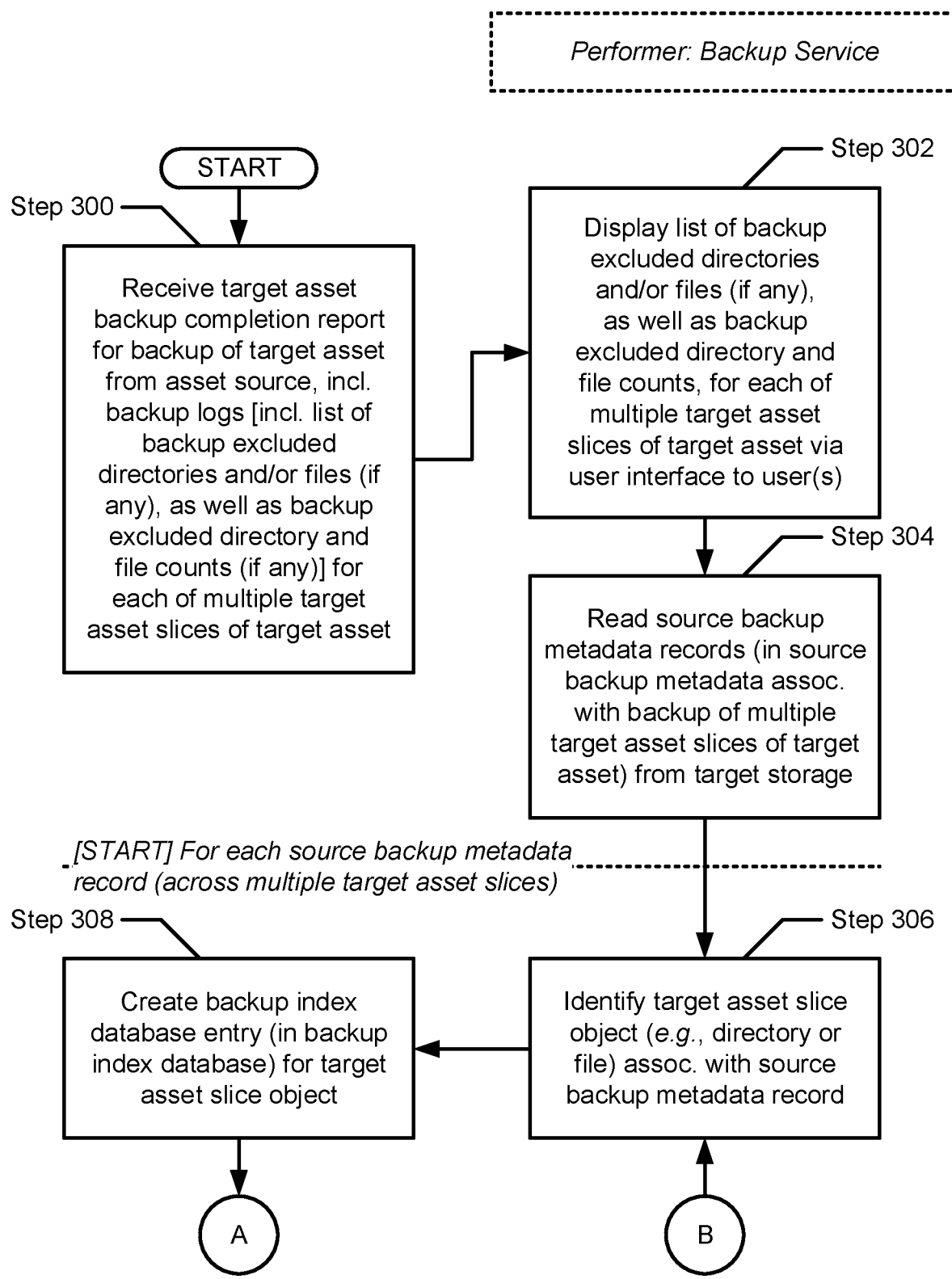
FIGS. 3A and 3B show flowcharts describing a method for post-backup exclusion rule creation in accordance with one or more embodiments described herein.
Figure 3B:
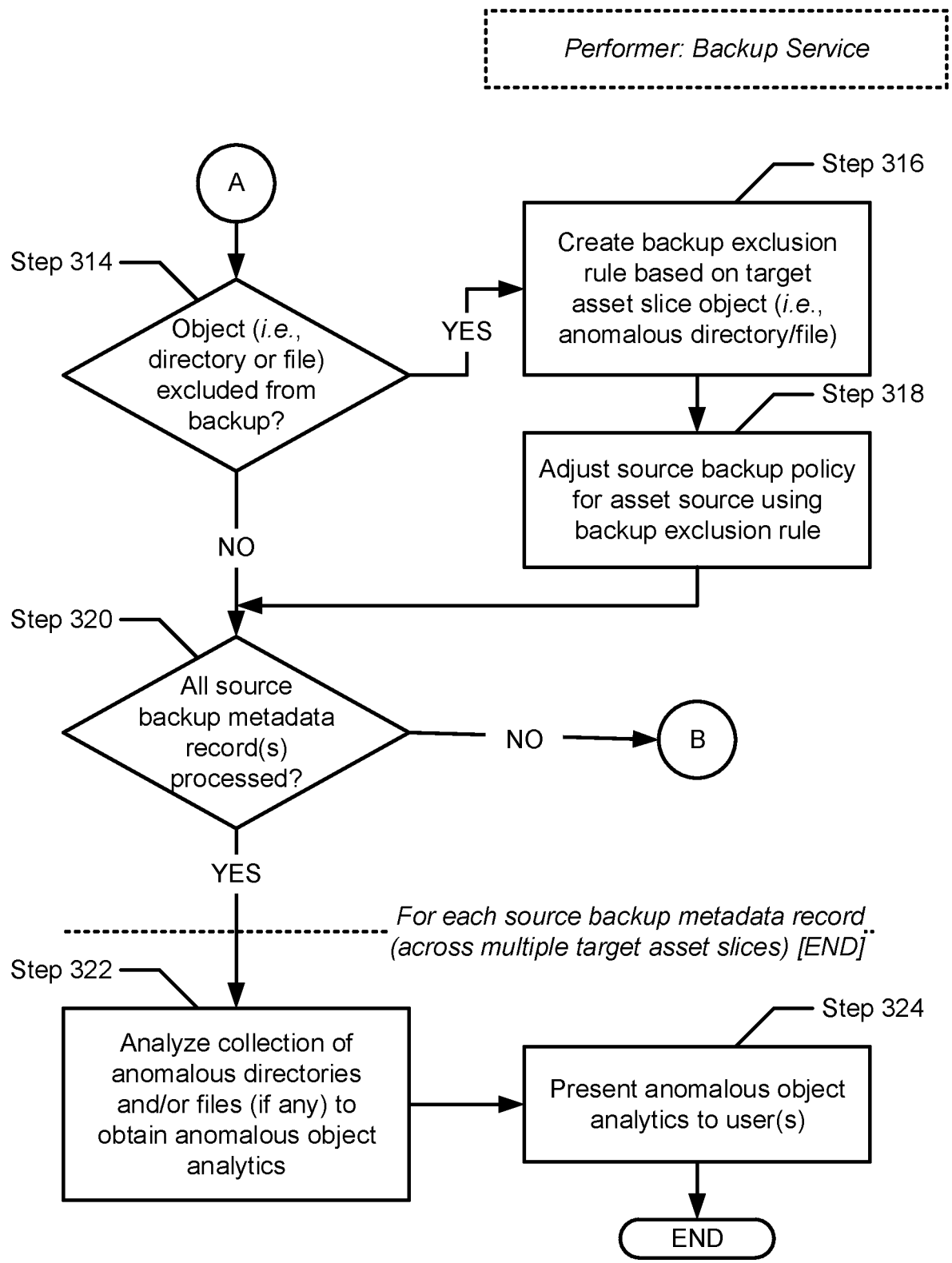

FIGS. 3A and 3B show flowcharts describing a method for post-backup exclusion rule creation in accordance with one or more embodiments described herein. The various steps outlined below may be performed by the backup service (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a target asset backup completion report is received from an asset source (see e.g., FIGS. 1A and 1C). In one or many embodiment(s) described herein, the target asset backup completion report may refer to a document e.g., a JavaScript Object Notation (JSON) file, a Comma Separated Values (CSV) file, a Yet Another Markup Language (YAML) file, etc.) configured to reflect metadata describing a completed backup of a target asset (e.g., an asset (see e.g., FIG. 1C targeted for backup)). Said reflected metadata may include, but may not be limited to: a compilation of backup logs specifying any number of events (e.g., transactions, errors/warnings (if any), etc.) that had transpired throughout the backup of the target asset; a list of any (anomalous) directory/directories and/or file(s) per target asset slice (described below) that had been excluded from source backup data (see e.g., FIG. 1D) respective to the target asset; a backup excluded directory count (see e.g., FIGS. 2A-2C) per target asset slice; and a backup excluded file count (see e.g., FIGS. 2A-2C) per target asset slice.

In one or many embodiment(s) described herein, any target asset slice may refer to a portion or partition of the target asset (for which the target asset backup completion report had been received in Step 300). Further, any target asset slice may be created such that a target asset slice size thereof does not exceed a predefined target asset slice size expressed either in bytes (e.g., 200 GB) or in a number of files (e.g., 1 million files). Moreover, as the target asset may encompass enterprise information (e.g., data, metadata, and/or state) organized and accessible through one or more file system implementations, any target asset slice created therefrom may include a portion of said enterprise information, as well as a corresponding portion of said file system implementation(s) respectively organizing and providing accessibility to said enterprise information portion.

In Step 302, information, relevant to anomalous objects (if any had been encountered during the backup of the target asset (for which the target asset backup completion report had been received in Step 300), is displayed, or otherwise provided, to any number of administrators and/or users of the enterprise IT environment (e.g., the system-see e.g., FIG. 1A). In one or many embodiment(s) described herein, said information may be extracted or derived from the target asset backup completion report and, accordingly, may include: the list of any (anomalous) directory/directories and/or file(s) per target asset slice that had been excluded from source backup data respective to the target asset; the backup excluded directory count per target asset slice of the target asset; and the backup excluded file count per target asset slice of the target asset.

In Step 304, target storage (see e.g., FIGS. 1A and 1D) is accessed to read source backup metadata therefrom. In one or many embodiment(s) described herein, the source backup metadata may pertain to the recently completed backup of the target asset (for which the target asset backup completion report had been received in Step 300). Further, the source backup metadata may be organized into any number of source backup metadata records—each of which may store object metadata for a given target asset slice object (i.e., a directory or a file) found within a given target asset slice of the target asset.

A subset of the remaining steps (i.e., Steps 306, 308, 314, 316, 318, and 320) presented and described hereinafter are pertinent to, and thus are performed for, each source backup metadata record (identified amongst the source backup metadata read in Step 304).

In Step 306, following a reading of source backup metadata from target storage (in Step 304) or following the alternate determination (to be made in Step 320) that at least one source backup metadata record remains to be processed, a target asset slice object is identified. In one or many embodiment(s) described herein, the target asset slice object may represent either a directory, which may be associated with the source backup metadata record (of the source backup metadata read/accessed from target storage in Step 304).

In Step 308, a backup index database entry (see e.g., FIG. 1B), for the target asset slice object (identified in Step 306), is created. In one or many embodiment(s) described herein, the backup index database entry may store object metadata descriptive of the target asset slice object, which may be obtained from the source backup metadata record. Said object metadata, accordingly, may include: an object path specifying a file system location of the target asset slice object within the target asset; a number or cardinality of child objects (e.g., sub-directories and/or files) (if any) contained within/by the target asset slice object; and/or (if applicable) at least one reason justifying an exclusion of the target asset slice object from any source backup data respective to the target asset. Furthermore, the object metadata is not limited to the aforementioned specific examples.

Turning to FIG. 3B, in Step 314, following creation of a backup index database entry (in Step 308) for the target asset slice object (identified in Step 306), a determination is made as to whether the target asset slice object has been excluded from the recently completed backup of the target asset (for which the target asset backup completion report had been received in Step 300). The determination may entail assessing whether the target asset slice object is specified in the list of any (anomalous) directory/directories and/or file(s) per target asset slice (included in the received target asset backup completion report). In one or many embodiment(s) described herein, if it is determined that the target asset slice object has been excluded from the recently completed backup of the target asset (i.e., by being specified in the list of anomalous directory/directories and/or file(s) per target asset slice), then the method proceeds to Step 316. On the other hand, in one or many other embodiment(s) described herein, if it is alternatively determined that the target asset slice object has not been excluded from the recently completed backup of the target asset (i.e., by not being specified in the list of anomalous directory/directories and/or file(s) per target asset slice), then the method alternatively proceeds to Step 320.

In Step 316, following the determination (made in Step 314) that the target asset slice object (identified in Step 306) has been excluded from the recently completed backup of the target asset (for which the target asset backup completion report had been received in Step 300) (i.e., by being specified in the list of anomalous directory/directories and/or file(s) per target asset slice included in the target asset backup completion report), a backup exclusion rule is created for or based on the target asset slice object. In one or many embodiment(s) described herein, the backup exclusion rule may refer to a rule (or filter) configured to exclude the target asset slice object (i.e., an anomalous directory or file from any future backup(s) involving the target asset.

In Step 318, using the backup exclusion rule (created in Step 316), a source backup policy, for an asset source, is adjusted. In one or many embodiment(s) described herein, the source backup policy may refer to a set of rules and procedures outlining a strategy for protecting (e.g., via any number of backup operations) enterprise information (or at least a portion thereof) maintained on the asset source, where the target asset (for which the target asset backup completion report had been received in Step 300) may be accessible through the asset source. Further, the source backup policy may be adjusted, for example, through integration of the backup exclusion rule there-within, which would enforce the exclusion of the target asset slice object (associated with the backup exclusion rule) from any future backup operation(s) involving the target asset.

In Step 320, following the alternate determination (made in Step 314) that the target asset slice object (identified in Step 306) has not been excluded from the recently completed backup of the target asset (for which the target asset backup completion report had been received in Step 300) (i.e., by not being specified in the list of anomalous directory/directories and/or file(s) per target asset slice included in the target asset backup completion report), or following adjustment of a source backup policy (in Step 318), a determination is made as to whether that all source backup metadata record(s) (collectively forming the source backup metadata read from target storage in Step 304) has/have been processed. In one or many embodiment(s) described herein, if it is determined that at least one source backup metadata record remains to be processed, then the method proceeds to Step 306 (see e.g., FIG. 3A). On the other hand, in one or many other embodiment(s) described herein, if it is alternatively determined that zero source backup metadata records remain to be processed, then the method alternatively proceeds to Step 322.

In Step 322, following the alternate determination (made in Step 320) that zero source backup metadata records (collectively forming the source backup metadata read from target storage in Step 304) remain to be processed, any number of target asset slice objects (each determined to be an anomalous directory or file in Step 314) is/are analyzed. Further, analysis of the anomalous target asset slice object(s) may result in an obtaining of anomalous object analytics, which may provide various information such as, for example, how much target asset data is protected, how much target asset data is left unprotected, and what percentage of target asset data has been labeled anomalous.

In Step 324, the anomalous object analytics (obtained in step 322) is presented, or otherwise provided, to any number of administrators and/or users. Thereafter, in one or many embodiment(s) described herein, the anomalous object analytics may be examined and/or used by said administrator(s) and/or user(s) to better manage and protect the enterprise information (e.g., data, metadata, and/or state) maintained throughout the enterprise IT environment. By way of examples, approaches through which said enterprise information can be better managed and/or protected may include the proactive removal of any future anomalous directories and/or files from said enterprise information, thereby maximizing the data protection success rate and minimizing the occurrence of any data loss scenarios.

Figure 4:
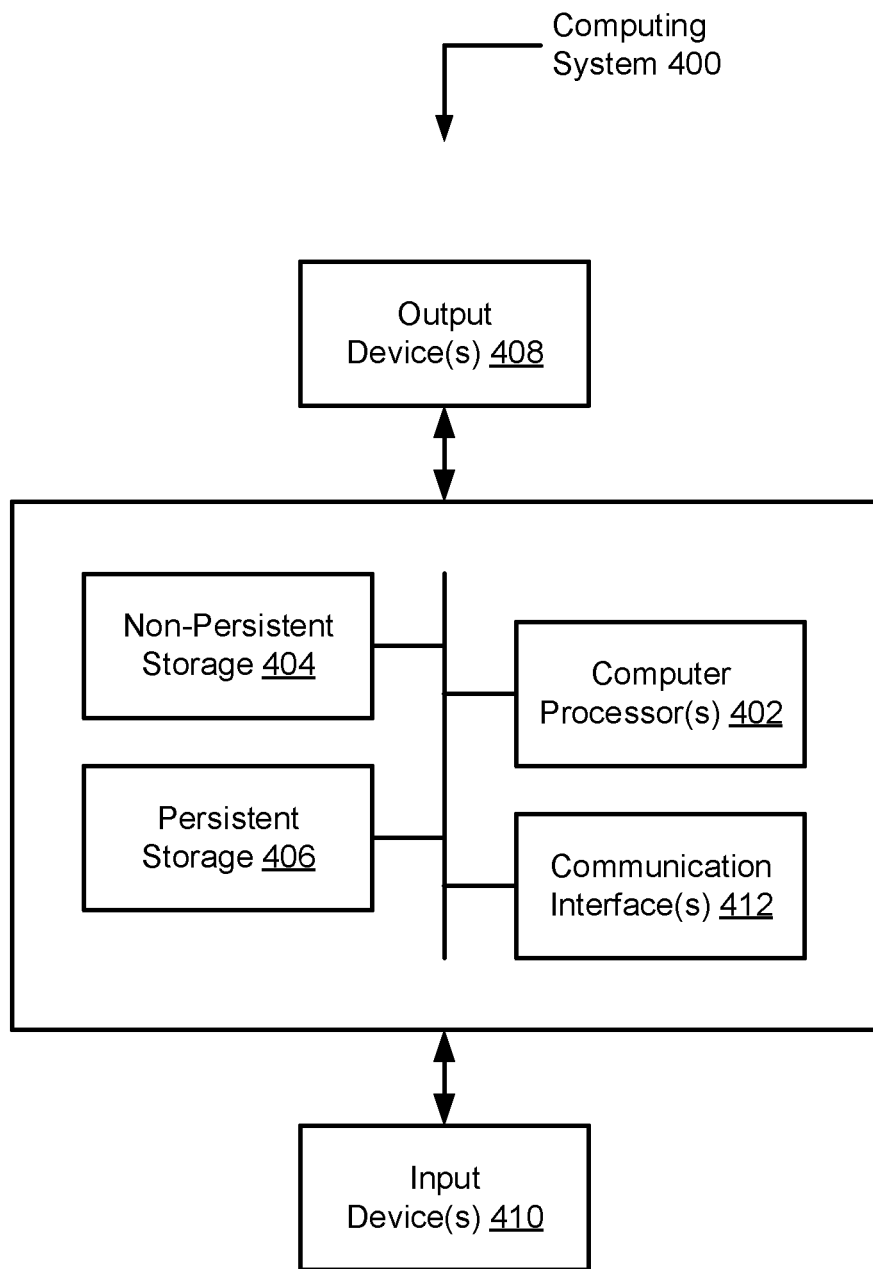
FIG. 4 shows an exemplary computing system in accordance with one or more embodiments described herein.

FIG. 4 shows an exemplary computing system in accordance with one or more embodiments described herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or many embodiment(s) described herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one or many embodiment(s) described herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for anomalous object management during backup operations, the method comprising:
   identifying a target asset;
   for at least one target asset slice of multiple target asset slices partitioning the target asset:
      identifying an anomalous target asset slice object;
      excluding the anomalous target asset slice object from source backup data;
      creating, within source backup metadata, a source backup metadata record for the anomalous target asset slice object; and
   writing the source backup data and the source backup metadata to target storage.

2. The method of claim 1, wherein the target asset is one selected from a group comprising local storage, a network attached storage (NAS) share, a virtual machine, and a database application.

3. The method of claim 1, wherein the anomalous target asset slice object is a directory, and wherein the anomalous target asset slice object is excluded from the source backup data based on a determination that the directory is specified in a slice directory exclusion object.

4. The method of claim 1, wherein the anomalous target asset slice object is a file.

5. The method of claim 4, wherein the anomalous target asset slice object is excluded from the source backup data based on a determination that the file is specified in a slice file exclusion object.

6. The method of claim 4, wherein the anomalous target asset slice object is excluded from the source backup data based on a determination that the file is a cloud-tier file.

7. The method of claim 4, wherein the anomalous target asset slice object is excluded from the source backup data based on a determination that the file is inaccessible.

8. The method of claim 1, wherein the source backup metadata record comprises object metadata for the anomalous target asset slice object, the object metadata comprising:
an object path indicating a file system location of the anomalous target asset slice object in the target asset; and
a reason justifying an exclusion of the anomalous target asset slice object from the source backup data.

9. The method of claim 1, the method further comprising:
creating a backup exclusion rule based on the anomalous target asset slice object; and
adjusting, using the backup exclusion rule, a source backup policy associated with an asset source through which the target asset is accessible.

10. A non-transitory computer readable medium (CRM) comprising computer readable program code, which when executed by a computer processor, enables the computer processor to perform a method for anomalous object management during backup operations, the method comprising:
identifying a target asset;
for at least one target asset slice of multiple target asset slices partitioning the target asset:
identifying an anomalous target asset slice object;
excluding the anomalous target asset slice object from source backup data;
creating, within source backup metadata, a source backup metadata record for the anomalous target asset slice object; and
writing the source backup data and the source backup metadata to target storage.

11. The non-transitory CRM of claim 10, wherein the target asset is one selected from a group comprising local storage, a network attached storage (NAS) share, a virtual machine, and a database application.

12. The non-transitory CRM of claim 10, wherein the anomalous target asset slice object is a directory, and wherein the anomalous target asset slice object is excluded from the source backup data based on a determination that the directory is specified in a slice directory exclusion object.

13. The non-transitory CRM of claim 10, wherein the anomalous target asset slice object is a file.

14. The non-transitory CRM of claim 13, wherein the anomalous target asset slice object is excluded from the source backup data based on a determination that the file is specified in a slice file exclusion object.

15. The non-transitory CRM of claim 13, wherein the anomalous target asset slice object is excluded from the source backup data based on a determination that the file is a cloud-tier file.

16. The non-transitory CRM of claim 13, wherein the anomalous target asset slice object is excluded from the source backup data based on a determination that the file is inaccessible.

17. The non-transitory CRM of claim 10, wherein the source backup metadata record comprises object metadata for the anomalous target asset slice object, the object metadata comprising:
an object path indicating a file system location of the anomalous target asset slice object in the target asset; and
a reason justifying an exclusion of the anomalous target asset slice object from the source backup data.

18. The non-transitory CRM of claim 10, the method further comprising:
creating a backup exclusion rule based on the anomalous target asset slice object; and
adjusting, using the backup exclusion rule, a source backup policy associated with an asset source through which the target asset is accessible.

19. A system, the system comprising:
target storage;
a target asset; and
an asset source through which the target asset is accessible, operatively connected to the target storage, and comprising:
a computer processor configured to perform a method for anomalous object management during backup operations, the method comprising:
identifying the target asset;
for at least one target asset slice of multiple target asset slices partitioning the target asset:
identifying an anomalous target asset slice object;
excluding the anomalous target asset slice object from source backup data;
creating, within source backup metadata, a source backup metadata record for the anomalous target asset slice object; and
writing the source backup data and the source backup metadata to the target storage.

20. The system of claim 19, the system further comprising:
a backup service operatively connected to the target storage and the asset source, and comprising:
a second computer processor configured to:
receive a target asset backup completion report from the asset source following writing of the source backup data and the source backup metadata to the target storage;
in response to receiving the target asset backup completion report:
create a backup exclusion rule based on the anomalous target asset slice object; and
adjust, using the backup exclusion rule, a source backup policy associated with the asset source.

* * * * *